(12) United States Patent
Tran et al.

(10) Patent No.: US 12,118,119 B2
(45) Date of Patent: Oct. 15, 2024

(54) FEDERATED PRIVATE ADVERSARIAL TRAINING

(71) Applicant: International Business Machines Corporation, Armonk, NY (US)

(72) Inventors: Ngoc Minh Tran, Dublin (IE); Mathieu Sinn, Dublin (IE); Stefano Braghin, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 543 days.

(21) Appl. No.: 17/110,369

(22) Filed: Dec. 3, 2020

(65) Prior Publication Data

US 2022/0179990 A1 Jun. 9, 2022

(51) Int. Cl.
G06F 21/62 (2013.01)
G06F 18/214 (2023.01)
G06N 20/00 (2019.01)

(52) U.S. Cl.
CPC ...... *G06F 21/6245* (2013.01); *G06F 18/2148* (2023.01); *G06N 20/00* (2019.01)

(58) Field of Classification Search
CPC .. G06F 21/6245; G06F 18/2148; G06N 20/00
See application file for complete search history.

(56) References Cited

U.S. PATENT DOCUMENTS 11,036,857 B2 * 6/2021 Tran .................. G06N 3/045
11,494,701 B1 * 11/2022 Resheff ............ G06F 16/9535

| | | | |
|---|---|---|---|
| 2017/0372226 A1 | 12/2017 | Costa | |
| 2018/0137389 A1 * | 5/2018 | Mathieu | G06V 10/454 |
| 2019/0325163 A1 * | 10/2019 | Sharad | G06F 21/82 |
| 2020/0218937 A1 * | 7/2020 | Visentini Scarzanella | G06V 10/774 |
| 2020/0366459 A1 * | 11/2020 | Nandakumar | H04L 9/008 |
| 2020/0387608 A1 * | 12/2020 | Miller | G06N 3/04 |
| 2020/0394471 A1 * | 12/2020 | Ganapavarapu | G06F 18/2185 |
| 2021/0073376 A1 * | 3/2021 | Tran | G06N 3/045 |

(Continued)

OTHER PUBLICATIONS

Aslett et al., "A Review of Homomorphic Encryption and Software Tools for Encrypted Statistical Machine Learning", Aug. 26, 2015, 21 pages, <http://arxiv.org/abs/1508.06574v1>.

(Continued)

*Primary Examiner* — Shin-Hon (Eric) Chen
*Assistant Examiner* — Thomas A Carnes
(74) *Attorney, Agent, or Firm* — Randy Tejeda

(57) ABSTRACT

One or more computer processors transmit a machine learning model and an associated loss function to a worker, wherein the worker isolates private data. The one or more computer processors receive a plurality of encrypted gradients computed utilizing the transmitted machine learning model, the associated loss function, and the isolated private data. The one or more computer processors generate a plurality of adversarial perturbations, wherein the plurality of adversarial perturbations includes true perturbations and false perturbations. The one or more computer processors obfuscate the generated plurality of adversarial perturbations. The one or more computer processors transmit the obfuscated adversarial perturbations to the worker. The one or more computer processors harden the machine learning model utilizing the transmitted obfuscated adversarial perturbations and the private data.

14 Claims, 4 Drawing Sheets

(56) References Cited

U.S. PATENT DOCUMENTS

| | | | |
|---|---|---|---|
| 2021/0303695 A1* | 9/2021 | Grosse | G06N 3/08 |
| 2021/0319098 A1* | 10/2021 | Pogorelik | G06F 21/554 |
| 2022/0036178 A1* | 2/2022 | Dimitriadis | G06N 3/08 |
| 2022/0100867 A1* | 3/2022 | Sinn | G06N 3/082 |

OTHER PUBLICATIONS

Bonawitz et al., "Practical Secure Aggregation for Privacy-Preserving Machine Learning", SIGSAC 2017, 21 pages.

Cao et al., "A Federated Learning Framework for Privacy-preserving and Parallel Training", ResearchGate, Preprint—Jan. 2020, 13 pages.

Chen et al., "Distributed Statistical Machine Learning in Adversarial Settings: Byzantine Gradient Descent", Proc. ACM Meas. Anal. Comput. Syst. 1, 2, Article 44 (Dec. 2017), 25 pages, <https://doi.org/10.1145/3154503>.

Goodfellow et al., "Explaining and Harnessing Adversarial Examples", Published as a conference paper at ICLR 2015, arXiv:1412.6572v3 [stat.ML] Mar. 20, 2015, 11 pages.

Hardy et al., "Private Federated Learning on Vertically Partitioned Data via Entity Resolution and Additively Homomorphic Encryption", arXiv:1711.10677v1 [cs.LG] Nov. 29, 2017, 60 pages.

Hayes et al., "Contamination Attacks and Mitigation in Multi-Party Machine Learning", 32nd Conference on Neural Information Processing Systems (NeurIPS 2018), 12 pages.

Jang et al., "Objective Metrics and Gradient Descent Algorithms for Adversarial Examples in Machine Learning", ACSAC 2017, 16 pages.

Kantarcioglu et al., "Privacy-Preserving Distributed Mining of Association Rules on Horizontally Partitioned Data", DMKD' 2002, 8 pages.

Kurakin et al., "Adversarial Examples in the Physical World", arXiv:1607.02533v4 [cs.CV] Feb. 11, 2017, 14 pages.

Madry et al., "Towards Deep Learning Models Resistant to Adversarial Attacks", arXiv:1706.06083v4 [stat.ML] Sep. 4, 2019, 28 pages.

Mangasarian et al., "Privacy-Preserving Classification of Horizontally Partitioned Data via Random Kernels", Downloaded Oct. 29, 30, 11 pages.

Nasr et al., "Machine Learning with Membership Privacy using Adversarial Regularization", arXiv:1807.05852v1 [stat.ML] Jul. 16, 2018, 14 pages.

Que et al., "A Collaborative Framework for Distributed Privacy-Preserving Support Vector Machine Learning", AMIA 2012, 10 pages.

Schein et al., "Locally Private Bayesian Inference for Count Models", arXiv:1803.08471v3 [stat.ML] Feb. 21, 2019, 10 pages.

Song et al., "Privacy Risks of Securing Machine Learning Models against Adversarial Examples", CCS '19, Nov. 11-15, 2019, 17 pages, <https://doi.org/10.1145/3319535.3354211>.

Sweeney et al., "A Multiparty Computation for Randomly Ordering Players and Making Random Selections", CMU-ISRI-04-126, Pittsburgh: Jul. 2004, 39 pages.

Truex et al., "A Hybrid Approach to Privacy-Preserving Federated Learning", arXiv:1812.03224v2 [cs.LG] Aug. 14, 2019, 11 pages.

Wan et al., "Privacy-Preservation for Gradient Descent Methods", KDD'07, Copyright 2007 ACM, 9 pages.

Yang et al., "Federated Machine Learning: Concept and Applications", arXiv:1902.04885v1 [cs.AI] Feb. 13, 2019, 19 pages.

Yu et al., "Privacy-Preserving SVM Classification on Vertically Partitioned Data", PAKDD 2006, 10 pages.

* cited by examiner

```
for each clean example:
    attack = random_get_from(attack_list)
    while not converged:
        encr_res = receive_encrypted_results from W ( )
        pert = attack(encr_res)                          // generate pertubation
        p = sample_from_uniform (0, 1)
        if p < prob then:
            send_to_W (pert)                             // send true perturbation
        else:
            sum = encrypted_random_noise ( )
            send_to_W (pert + sum)                       // send false perturbation
            for i in range (random_int (N)) :
                receive_encrypted_results_from_W ( )
                r = encrypted_random_noise ( )           //  send false perturbation
                send_to_W (r)
                sum += r
            receive_encrypted_results_from_W ( )
            send_to_W (-sum)                             // send false perturbation
```

FIG. 3

FEDERATED PRIVATE ADVERSARIAL TRAINING

STATEMENT REGARDING SPONSORED RESEARCH OR DEVELOPMENT

The project leading to this application has received funding from the European Union's Horizon 2020 research and innovation programme under grant agreement No 824988.

BACKGROUND

The present invention relates generally to the field of machine learning, and more particularly to federated private adversarial training.

Deep learning is a branch of machine learning based on a set of algorithms that model high-level abstractions in data by using model architectures, with complex structures or otherwise, often composed of multiple non-linear transformations. Deep learning is part of a broader family of machine learning methods based on learning representations of data. An observation (e.g., an image) can be represented in many ways such as a vector of intensity values per pixel, or in a more abstract way as a set of edges, regions of particular shape, etc. Some representations make it easier to learn tasks (e.g., face recognition or facial expression recognition) from examples. Deep learning algorithms often use a cascade of many layers of nonlinear processing units for feature extraction and transformation. Each successive layer uses the output from the previous layer as input. The algorithms may be supervised or unsupervised, and applications include pattern analysis (unsupervised) and classification (supervised).

Neural networks (NNs) are computing systems inspired by biological neural networks. NNs are not simply algorithms, but rather a framework for many different machine learning algorithms to work together and process complex data inputs. Such systems learn to perform tasks by considering examples, generally without being programmed with any task-specific rules. For example, in image recognition, NNs learn to identify images that contain cats by analyzing example images that are correctly labeled as true or false (e.g., cat or not cat) and using the results to identify objects (e.g., cats) in other images. In this example, NNs classify without any prior knowledge about cats, for example, that cats have fur, tails, whiskers, and pointy ears. Instead, NNs automatically generate identifying characteristics from the learning material. NNs are based on a collection of connected units or nodes called artificial neurons, which loosely model the neurons in a biological brain where each connection, like the synapses in a biological brain, can transmit a signal from one artificial neuron to another. An artificial neuron that receives a signal can process the signal and then transfer the signal to additional artificial neurons.

In common NN implementations, the signal at a connection between artificial neurons is a real number, and the output of each artificial neuron is computed by some non-linear function of the sum of its inputs. The connections between artificial neurons are called edges. Artificial neurons and edges typically have a weight that adjusts as learning proceeds. The weight increases or decreases the strength of the signal at a connection. Artificial neurons may have a threshold such that the signal is only sent if the aggregate signal crosses that threshold. Typically, artificial neurons are aggregated into layers. Different layers may perform different kinds of transformations on their inputs. Signals travel from the first layer (the input layer), to the last layer (the output layer), possibly after traversing the layers multiple times.

Adversarial examples are modified version of a clean example that are intentionally perturbed (e.g. by adding noise) to confuse/fool a machine learning technique, such as deep neural networks. Adversarial perturbation is the noise that is added to the clean example to make it an adversarial example. An adversarial attack refers to feeding a targeted model with the adversarial examples during testing. Adversarial training refers to the training process of a machine learning model with input data containing both adversarial and clean examples. The class gradient of a classifier (e.g., machine learning model) refers to the per-class derivatives with respect to the input of the classifier. The loss gradient of a classifier refers to the gradient of the loss function with respect to the input of the classifier.

SUMMARY

Embodiments of the present invention disclose a computer-implemented method, a computer program product, and a system. The computer-implemented method includes one or more computer processers transmitting a machine learning model and an associated loss function to a worker, wherein the worker isolates private data. The one or more computer processors receive a plurality of encrypted gradients computed utilizing the transmitted machine learning model, the associated loss function, and the isolated private data. The one or more computer processors generate a plurality of adversarial perturbations, wherein the plurality of adversarial perturbations includes true perturbations and false perturbations. The one or more computer processors obfuscate the generated plurality of adversarial perturbations. The one or more computer processors transmit the obfuscated adversarial perturbations to the worker. The one or more computer processors harden the machine learning model utilizing the transmitted obfuscated adversarial perturbations and the private data.

BRIEF DESCRIPTION OF THE DRAWINGS

FIG. 3 is a code snippet depicting operational steps of an adversarial generation module, on a server computer within the computational environment of FIG. 1, in accordance with an embodiment of the present invention.

DETAILED DESCRIPTION

Data is often distributed throughout many different departments within an organization or even throughout multiple cooperating corporations. Often, transferring or utilizing said data is not possible subject to cross-boundary restrictions, legal obligations, internal governance, or risk and compliance controls. These restrictions can significantly impair businesses and organizations that rely on the training and distribution of artificial intelligence processes and products. Federated machine learning can help to mitigate data restrictions while providing an efficient method to train machine learning models. In addition, there are many circumstances when controlling access to training data and associated private data is imperative while concurrently allowing participants access to model training and hardening processes, for example, to defend against adversarial attacks and model poisoning. Adversaries or bad actors can infect machine learning models, such as neural networks, with backdoor data that can trick models to classify attacker-chosen inputs to a target label while retraining correct predictions for normal inputs. This anomalous behavior is activated by key inputs learned by the model in the training phase utilizing the infected data. This particularly relevant for scenarios comprising unsecure or unverified data acquisition, such as crowdsourced data. In addition, this issue significantly affects models that are frequently retrained, third party customized (e.g. from model marketplace), and models that utilize transfer learning methods.

Embodiments of the present invention provide a method for machine learning model adversarial training in a federated private environment. Embodiments of the present invention train and harden a machine learning model in a federated fashion with privacy support for multiple users or workers. Embodiments of the present invention work in a federated environment where data is distributed and kept private while associated adversarial strategies are isolated from workers. Embodiments of the present invention harden machine learning models against adversarial attacks and associated perturbation. Embodiments of the present invention generate adversarial perturbations, examples, and data while maintaining worker (i.e., user, participant, etc.) isolation and privacy. Implementation of embodiments of the invention may take a variety of forms, and exemplary implementation details are discussed subsequently with reference to the Figures.

The present invention will now be described in detail with reference to the Figures.

Figure 1:
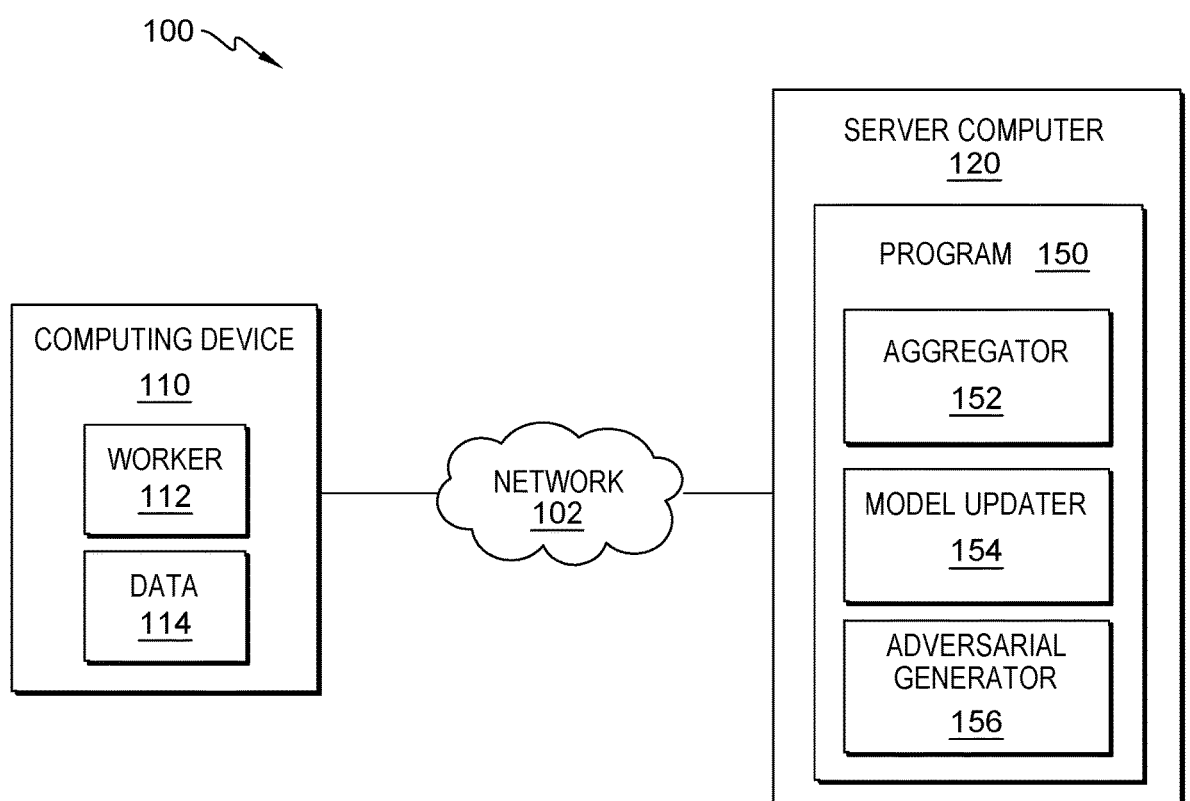
FIG. 1 is a functional block diagram illustrating a computational environment, in accordance with an embodiment of the present invention.

FIG. 1 is a functional block diagram illustrating a computational environment, generally designated 100, in accordance with one embodiment of the present invention. The term "computational" as used in this specification describes a computer system that includes multiple, physically, distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computational environment 100 includes server computer 120 connected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between server computer 120, and other computing devices (not shown) within computational environment 100. In various embodiments, network 102 operates locally via wired, wireless, or optical connections and can be any combination of connections and protocols (e.g., personal area network (PAN), near field communication (NFC), laser, infrared, ultrasonic, etc.).

Computing device 110 may be any electronic device or computing system capable of processing program instructions and receiving and sending data. In some embodiments, computing device 110 may be a laptop computer, a tablet computer, a netbook computer, a personal computer (PC), a desktop computer, a personal digital assistant (PDA), a smart phone, or any programmable electronic device capable of communicating with network 102. In other embodiments, computing device 110 may represent a server computing system utilizing multiple computers as a server system, such as in a cloud computing environment. In general, computing device 110 is representative of any electronic device or combination of electronic devices capable of executing machine readable program instructions as described in greater detail with regard to FIG. 4, in accordance with embodiments of the present invention. In an embodiment, computational environment 100 contains a plurality of computing device 110, each containing worker 112 and data 114. Worker 112 is a participant providing private data. In an embodiment, each worker in a plurality of workers is isolated and inaccessible from other participants and associated workers. Data 114 is one or more sets of data privately owned by the participant and accessible by an associated worker. Data 114 is utilized to train one or more machine learning models through direct training or computed gradients.

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any programmable electronic device capable of communicating with other computing devices (not shown) within computational environment 100 via network 102. In another embodiment, server computer 120 represents a computing system utilizing clustered computers and components (e.g., database server computers, application server computers, etc.) that act as a single pool of seamless resources when accessed within computational environment 100. In the depicted embodiment, server computer 120 includes program 150. In other embodiments, server computer 120 may contain other applications, databases, programs, etc. which have not been depicted in computational environment 100. Server computer 120 may include internal and external hardware components, as depicted and described in further detail with respect to FIG. 4.

Program 150 is a program for machine learning model adversarial training in a federated private environment. In various embodiments, program 150 may implement the following steps: transmitting a machine learning model and an associated loss function to a worker, wherein the worker isolates private data; receiving, by one or more computer processors, a plurality of encrypted gradients computed utilizing the transmitted machine learning model, the associated loss function, and the isolated private data; generating a plurality of adversarial perturbations, wherein the plurality of adversarial perturbations includes true perturbations and false perturbations; obfuscating the generated plurality of adversarial perturbations; transmitting the obfuscated adversarial perturbations to the worker; and hardening the machine learning model utilizing the transmitted obfuscated adversarial perturbations and the private data. In the depicted embodiment, program 150 is a standalone software program. In another embodiment, the functionality of program 150, or any combination programs thereof, may be integrated into a single software program. In some embodiments, program 150 may be located on separate computing devices but can still communicate over network 102. In various embodiments, one or more client versions of program 150 reside on any other computing device within computational environment 100. In the depicted embodiment, program 150 includes aggregator 152, model updater 154, and adversarial generator 156.

Aggregator 152 is a coordinator module controlling the dissemination of models, the transfer and receipt of encrypted compute results and associated encryption keys. In an embodiment, aggregator 152 is isolated from direct access to data associated with each worker.

Model updater 154 is a module that utilizes one or more contained adversarial strategies and associated generated adversarial data to retrain and harden one or more machine learning models. In another embodiment, model updater 154 provides workers a method to train one or more models with private data while preventing workers from obtaining information regarding utilized strategies. In an embodiment, the machine learning model is representative of a model utilizing deep learning techniques to train, calculate weights, ingest inputs, and output a plurality of solution vectors. In this embodiment, the machine learning model utilizes transferrable neural networks algorithms and models (e.g., long short-term memory (LSTM), deep stacking network (DSN), deep belief network (DBN), convolutional neural networks (CNN), compound hierarchical deep models, etc.) that can be trained with supervised or unsupervised methods.

Adversarial generator 156 is a model that receives an adversarial strategy (e.g., list of attackers as well as a strategy of how to combine these attackers to produce adversarial examples) and worker computed gradients to generate a plurality of adversarial perturbations, examples, and adversarial training data. Program 150 is depicted and described in further detail with respect to FIG. 2.

The present invention may contain various accessible data sources that may include personal storage devices, data, content, or information the user wishes not to be processed. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Program 150 provides informed consent, with notice of the collection of personal data, allowing the user to opt in or opt out of processing personal data. Consent can take several forms. Opt-in consent can impose on the user to take an affirmative action before the personal data is processed. Alternatively, opt-out consent can impose on the user to take an affirmative action to prevent the processing of personal data before the data is processed. Program 150 enables the authorized and secure processing of user information, such as tracking information, as well as personal data, such as personally identifying information or sensitive personal information. Program 150 provides information regarding the personal data and the nature (e.g., type, scope, purpose, duration, etc.) of the processing. Program 150 provides the user with copies of stored personal data. Program 150 allows the correction or completion of incorrect or incomplete personal data. Program 150 allows the immediate deletion of personal data.

Figure 2:
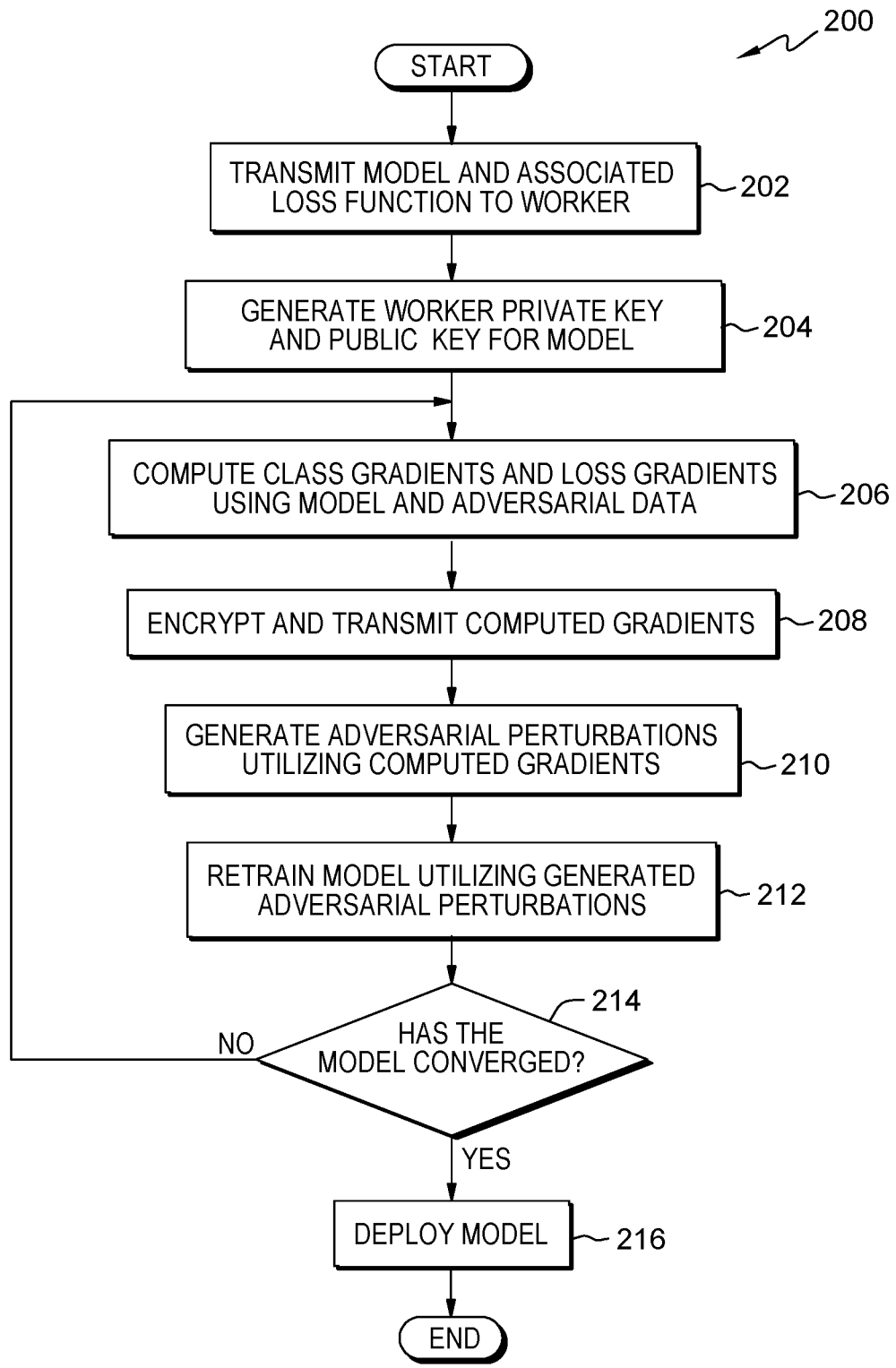
FIG. 2 is a flowchart depicting operational steps of a program, on a server computer within the computational environment of FIG. 1, for federated private adversarial training, in accordance with an embodiment of the present invention.

FIG. 2 depicts flowchart 200 illustrating operational steps of program 150 for machine learning model adversarial training in a federated private environment, in accordance with an embodiment of the present invention.

Program 150 transmits a model and associated loss function to a worker (step 202). In an embodiment, program 150 initiates responsive to a training request from one or more workers (e.g., worker 112). In an embodiment, program 150 initiate responsive to a novel adversarial attack or a determined vulnerability associated the model. In an embodiment, program 150 (e.g., aggregator 152) transmits to one or more distinct workers a machine learning model, hereinafter model, and an associated loss function. For example, program 150 transfers a convolutional neural network (e.g., CNN), trained to identify clothing items, and an associated multi-class cross-entropy loss function to the worker. In an embodiment, program 150 is maintained on a server computer. In this embodiment, program 150 maintains a central repository of pretrained and/or genericized models. In a further embodiment, program 150 maintains a client version on a computing device associated with the worker to facilitate model transmission and storage. In a further embodiment, program 150 initializes a model responsive to a request from one or more workers. In this embodiment, program 150 trains the model with clean data while generating adversarial data according to one or more adversarial strategies based on one or more adversarial attacks. Further, program 150 utilizes the generated adversarial data to harden the model against subsequent similar adversarial attacks. In another embodiment, program 150 transmits additional adversarial training data.

Program 150 generates a worker private key and public key for the model (step 204). In an embodiment, the worker provides a private key and public key pair. In an embodiment, program 150 utilizes asymmetric cryptography to generate a private key and public key utilized to encrypt and decrypt subsequent computational results. In various embodiment, the worker retains access to the private key while disseminating the public key without compromising security.

Program 150 computes class-gradients and loss-gradients using the model and adversarial data (step 206). In an embodiment, program 150 incorporates private data (i.e., data 114) controlled by the worker into the transferred model. In this embodiment, the worker computes a plurality of gradients (i.e., class-gradients and loss-gradients) associated with the transferred model with the incorporation of the private data controlled by the worker. In a further embodiment, program 150 includes transferred adversarial training data as additional training data. In another embodiment, the computed gradients are represented as one or more computational graphs. In various embodiments, the computed gradients are normalized by tuning one or more gradient magnitudes. In another embodiment, program 150 utilizes gradient scaling and gradient clipping to normalize one or more computed gradients.

Program 150 encrypts and transmits computed gradients (step 208). In an embodiment, program 150 utilizes homographic encryption (e.g., the created public and private keys) to securely transmit and/or receive the computed results (i.e., gradients) from step 206. In this embodiment, program 150 receives the encrypted computed gradients along with the public encryption key created in step 204. In a further embodiment, program 150 verifies that the computed results are from an authorized worker. In an embodiment, where the data fails to encrypt, program 150 genericizes the computed gradients, removing any identifying information.

Program 150 generates adversarial perturbations utilizing the computed gradients (step 210). In an embodiment, program 150 utilizes an adversarial generator (i.e., adversarial generator 156) with one or more adversarial strategies to generate a plurality of high epsilon adversarial data that each have an added perturbation that may change an associated class label according to a corresponding adversarial strategy. For example, program 150 generates a plurality of adversarial images for the model incorporating the received computed gradients. In a further embodiment, the adversarial generator receives and/or maintains a list of adversarial attacks, a probability threshold for the generation of true or false perturbation, and a required number of false perturbations (i.e., perturbation requirement) and associated steps required if the probability threshold is exceeded (e.g., initiating a false perturbation generation and transmission) or reached. In a further embodiment, program 150 adjusts the perturbation requirement based on difficulty of adversarial identification, system importance, computing constraints, and/or temporal constraints (e.g., time required to identify). For example, critical systems will have to satisfy a higher perturbation requirement (i.e., a greater number of transmitted false perturbations) than non-critical systems. In another example, easily identifiable adversarial strategies require higher perturbation requirements. This embodiment is further detailed in FIG. 3. In another embodiment, program 150 generates a plurality of adversarial perturbations comprising true and false perturbations, wherein false perturbations comprise random noise that do not affect model results and true perturbations comprise adversarial noise that affect model results (e.g., changing classification results) according to one or more adversarial strategies. In this embodiment, false perturbations are utilized to obscure adversarial strategies. In another embodiment, program 150 generates the perturbations by utilizing a linearized loss function. For example, program 150 utilizes an iterative gradient-based method that selects the least-likely prediction as a desired class. In an embodiment, program 150 iteratively performs, for each class contained in the testing set and/or validation set, one or more perturbations towards a specified class into a subset of adversarial data. In an embodiment, said adversarial strategies are kept hidden by program 150, preventing workers from obtaining information regarding said strategies and associated adversarial perturbations.

Program 150 retrains the model utilizing generated adversarial perturbations (step 212). In an embodiment, program 150 transmits or streams the generated adversarial perturbations to the worker and adding the adversarial perturbations as available training data for the worker. In a further embodiment, program 150 utilizes the public key from step 206 to encrypt the adversarial perturbations to a respective worker. In another embodiment, program 150 utilizes the generated adversarial perturbations and associated adversarial training data to update or retrain the model. In an embodiment, program 150 hardens the model by training the model utilizing the generated adversarial data for a robust model training. Responsively, program 150 transmits the retrained model to the worker.

If the model converges ("yes" branch, decision block 214), then program 150 deploys the model (step 216). In an embodiment, program 150 utilizes a plurality of model statistics to determine whether the model is ready for deployment or whether the model should continue training in order to increase predictive statistics and/or increase resistance to one or more adversarial attack strategies and methods. Program 150 can utilize one or more testing statements to calculate the predictive accuracy, label certainty values and distributions for the model. Responsive to one or more trained models, program 150 feeds one or more testing statements into the model to determine predictive accuracy. In an embodiment, program 150 runs a plurality of model assessments including, but not limited to, model fit assessments, k-fold cross validation, mean bias error, modified Nash-Sutcliffe efficiency, root mean square error, and correlation coefficient. In an embodiment, program 150 may prompt and receive user feedback through a graphical user interface (not depicted) on a client computing device. For example, the user can provide feedback for a classified testing statement. Program 150 may adjust corresponding gradients in order to remedy the model subject to the feedback.

Responsive to model convergence, program 150 deploys the model. In an embodiment, program 150 deploys the converged model to a production environment or server. In various embodiments, program 150 deploy the model to a plurality of respective production, test, or auxiliary environments. In an embodiment, the worker instructs program 150 to deploy a specific environment. In various embodiments, program 150 deploys a set of created models as a unified ensemble of models, allowing program 150 to utilize the unified package of models to input unknown data and output highly accurate predictions despite the individual weakness of each model in the package. In a further embodiment, program 150 utilizes the deployed ensemble of models to classify one or more unknown (i.e., not contained in a training dataset) data points. In an embodiment, program 150 containerizes the model and deploys the containerized model as a service in a cloud environment.

If the model does not converge ("no" branch, decision block 214), then program 150 sends the model and associated loss function to the worker (step 202). In an embodiment, program 150 continues to stream adversarial perturbations, as depicted in FIG. 3, until the model has converged. In an embodiment, program 150 continues to harden the model until convergence is achieved.

FIG. 3 depicts code snippet 300 demonstrating operational steps of an adversarial generation module. Code snippet 300 is an example method for generating and transmitting perturbations to a worker, where program 150 iterates over each clean training example contained in the data. In each iteration, program 150, randomly, selects an adversarial strategy from a list of adversarial strategies. While a model has not converged, program 150 generates a plurality of true and false perturbations. In an embodiment, program 150 establishes a probability threshold controlling the transmission of true perturbations. If a determined probability does not exceed or reach the probability threshold, program 150 transmits a true perturbation to a worker. Alternatively, if the determined probability exceeds the probability threshold, then program 150 enters an adversarial obfuscation loop determined by a required number of generated and transmitted false perturbations and associated steps. Here, program 150 transmits false perturbations (e.g., random noise) for a random number of times and due to this randomness, the receiving worker cannot infer any information from the perturbations.

Figure 4:
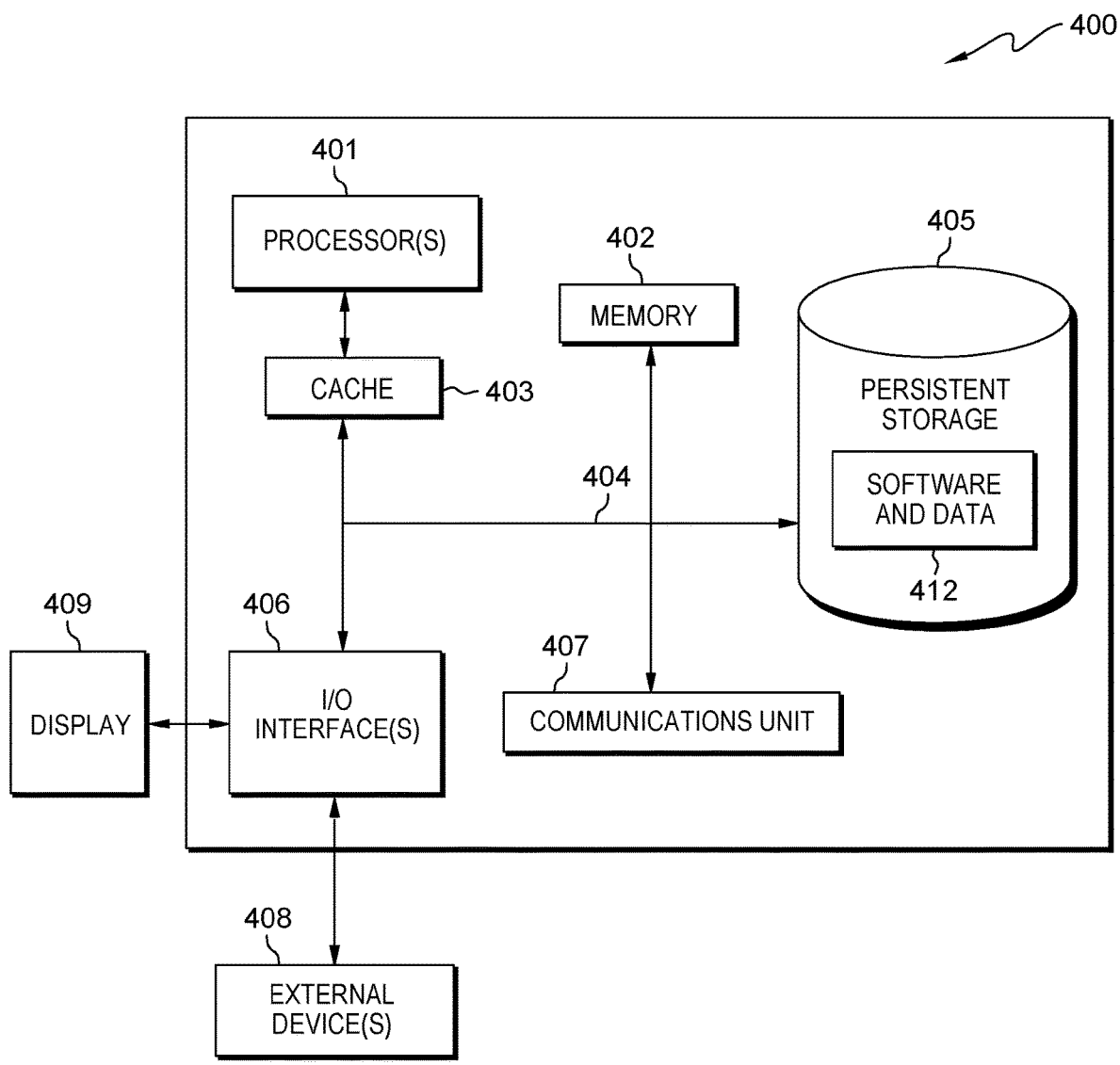
FIG. 4 is a block diagram of components of the server computer, in accordance with an embodiment of the present invention.

FIG. 4 depicts block diagram 400 illustrating components of server computer 120 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Server computer 120 each include communications fabric 404, which provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications, and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of computer processor(s) 401 by holding recently accessed data, and data near accessed data, from memory 402.

Program 150 may be stored in persistent storage 405 and in memory 402 for execution by one or more of the respective computer processor(s) 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 412 can be stored in persistent storage 405 for access and/or execution by one or more of the respective processors 401 via cache 403.

Communications unit 407, in these examples, provides for communications with other data processing systems or devices. In these examples, communications unit 407 includes one or more network interface cards. Communications unit 407 may provide communications through the use of either or both physical and wireless communications links. Program 150 may be downloaded to persistent storage 405 through communications unit 407.

I/O interface(s) 406 allows for input and output of data with other devices that may be connected to server computer 120. For example, I/O interface(s) 406 may provide a connection to external device(s) 408, such as a keyboard, a keypad, a touch screen, and/or some other suitable input device. External devices 408 can also include portable computer readable storage media such as, for example, thumb drives, portable optical or magnetic disks, and memory cards. Software and data used to practice embodiments of the present invention, e.g., program 150, can be stored on such portable computer readable storage media and can be loaded onto persistent storage 405 via I/O interface(s) 406. I/O interface(s) 406 also connect to a display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages, such as the "C" programming language or similar programming languages, and quantum programming languages such as the "Q" programming language, Q#, quantum computation language (QCL) or similar programming languages, low-level programming languages, such as the assembly language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    transmitting, by one or more computer processors, a machine learning model and an associated loss function to a worker, wherein the worker isolates private data from one or more adversarial strategies;
    computing, by one or more computer processors, a plurality of encrypted gradients on the worker utilizing the transmitted machine learning model and associated loss function with the incorporation of the isolated private data;
    generating, by one or more computer processors, a plurality of adversarial perturbations from the received plurality of encrypted gradients, wherein the plurality of adversarial perturbations includes true perturbations, that comprise adversarial noise that does change one or more subsequent machine learning model results, and false perturbations that comprise random noise that does not change one or more subsequent machine learning model results;
    transmitting, by one or more computer processors, the generated adversarial perturbations to the worker, comprising:
        transmitting, by one or more computer processors, one or more false perturbations to the worker until satisfying a perturbation requirement, wherein the false perturbations obscure at least one adversarial strategy;
        adjusting, by one or more computer processors, the perturbation requirement based on a difficulty of adversarial identification; and
        retraining, by one or more computer processors, the machine learning model utilizing the transmitted adversarial perturbations and the private data, comprising:
            responsive to the machine learning model not converging, continuously streaming, by one or more computer processors, the generated adversarial perturbations to the worker.

2. The computer-implemented method of claim 1, wherein transmitting the generated adversarial perturbations to the worker, comprises:
    responsive to a probability not exceeding a probability threshold, transmitting, by one or more computer processors, a true perturbation to the worker.

3. The computer-implemented method of claim 1, further comprising:
    adjusting, by one or more computer processors, the perturbation requirement based on a, system importance, computing constraints, and temporal constraints.

4. The computer-implemented method of claim 1, wherein transmitting the generated adversarial perturbations further comprises:
    encrypting, by one or more computer processors, the generated adversarial perturbations with a public key associated with the worker.

5. The computer-implemented method of claim 1, further comprising:
    deploying, by one or more computer processors, the retrained machine learning model as a service in a cloud environment.

6. A computer program product comprising:
    one or more computer readable storage media and program instructions stored on the one or more computer readable storage media, the stored program instructions comprising:
    program instructions to transmit a machine learning model and an associated loss function to a worker, wherein the worker isolates private data from one or more adversarial strategies;
    program instructions to compute a plurality of encrypted gradients on the worker utilizing the transmitted machine learning model and associated loss function with the incorporation of the isolated private data;
    program instructions to generate a plurality of adversarial perturbations from the received plurality of encrypted gradients, wherein the plurality of adversarial perturbations includes true perturbations, that comprise adversarial noise that does change one or more subsequent machine learning model results, and false perturbations that comprise random noise that does not change one or more subsequent machine learning model results;
    program instructions to transmit the generated adversarial perturbations to the worker, wherein the program instructions further comprise:
        program instructions to transmit one or more false perturbations to the worker until satisfying a perturbation requirement, wherein the false perturbations obscure at least one adversarial strategy;
        program instructions to adjust the perturbation requirement based on a difficulty of adversarial identification; and
        program instructions to retraining the machine learning model utilizing the transmitted adversarial perturbations and the private data, comprising:
            program instructions to, responsive to the machine learning model not converging, continuously stream the generated adversarial perturbations to the worker.

7. The computer program product of claim 6, wherein the program instructions to transmit the generated adversarial perturbations to the worker, comprises:
    program instructions to, responsive to a probability not exceeding a probability threshold, transmit a true perturbation to the worker.

8. The computer program product of claim 6, wherein the program instructions, stored on the one or more computer readable storage media, further comprise:
    program instructions to adjust the perturbation requirement based on a difficulty of, system importance, computing constraints, and temporal constraints.

9. The computer program product of claim 6, wherein the program instructions, stored on the one or more computer readable storage media, further comprise:
    program instructions to encrypt the generated adversarial perturbations with a public key associated with the worker.

10. The computer program product of claim 6, wherein the program instructions, stored on the one or more computer readable storage media, further comprise:
    program instructions to deploy the retrained machine learning model as a service in a cloud environment.

11. A computer system comprising: one or more computer processors;
    one or more computer readable storage media; and
    program instructions stored on the computer readable storage media for execution by at least one of the one or more processors, the stored program instructions comprising:
    program instructions to transmit a machine learning model and an associated loss function to a worker, wherein the worker isolates private data from one or more adversarial strategies;
    program instructions to compute a plurality of encrypted gradients on the worker utilizing the transmitted machine learning model and associated loss function with the incorporation of the isolated private data;
    program instructions to generate a plurality of adversarial perturbations from the received plurality of encrypted gradients, wherein the plurality of adversarial perturbations includes true perturbations, that comprise adversarial noise that does change one or more subsequent machine learning model results, and false perturbations that comprise random noise that does not change one or more subsequent machine learning model results;
    program instructions to transmit the generated adversarial perturbations to the worker, wherein the program instructions further comprise:
        program instructions to transmit one or more false perturbations to the worker until satisfying a perturbation requirement, wherein the false perturbations obscure at least one adversarial strategy;
        program instructions to adjust the perturbation requirement based on a difficulty of adversarial identification; and
        program instructions to retraining the machine learning model utilizing the transmitted adversarial perturbations and the private data, comprising:
            program instructions to, responsive to the machine learning model not converging, continuously stream the generated adversarial perturbations to the worker.

12. The computer system of claim 11, wherein the program instructions to transmit the generated adversarial perturbations to the worker, comprises:
    program instructions to, responsive to a probability not exceeding a probability threshold, transmit a true perturbation to the worker.

13. The computer system of claim 11, wherein the program instructions, stored on the one or more computer readable storage media, further comprise:
    program instructions to encrypt the generated adversarial perturbations with a public key associated with the worker.

14. The computer system of claim 11, wherein the program instructions, stored on the one or more computer readable storage media, further comprise:

program instructions to deploy the retrained machine learning model as a service in a cloud environment.

* * * * *